(12) United States Patent
Wylie

(10) Patent No.: US 6,424,965 B1
(45) Date of Patent: Jul. 23, 2002

(54) METHOD USING A DENSITY FIELD FOR LOCATING RELATED ITEMS FOR DATA MINING

(75) Inventor: Brian N. Wylie, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/409,674

(22) Filed: Oct. 1, 1999

(51) Int. Cl.$^7$ ............................................... G06F 17/30
(52) U.S. Cl. ........................ 707/2; 707/2; 707/3; 707/6; 345/848
(58) Field of Search ........................ 707/1–513; 345/848

(56) References Cited

U.S. PATENT DOCUMENTS

| | | | | |
|---|---|---|---|---|
| 5,787,422 A | * | 7/1998 | Tukey et al. ................... | 707/5 |
| 5,930,784 A | * | 7/1999 | Hendrickson .................. | 707/2 |

\* cited by examiner

Primary Examiner—Kim Vu
Assistant Examiner—Hung Pham
(74) Attorney, Agent, or Firm—V. Gerald Grafe; George H. Libman

(57) ABSTRACT

A method for locating related items in a geometric space transforms relationships among items to geometric locations. The method locates items in the geometric space so that the distance between items corresponds to the degree of relatedness. The method facilitates communication of the structure of the relationships among the items. The method makes use of numeric values as a measure of similarity between each pairing of items. The items are given initial coordinates in the space. An energy is then determined for each item from the item's distance and similarity to other items, and from the density of items assigned coordinates near the item. The distance and similarity component can act to draw items with high similarities close together, while the density component can act to force all items apart. If a terminal condition is not yet reached, then new coordinates can be determined for one or more items, and the energy determination repeated. The iteration can terminate, for example, when the total energy reaches a threshold, when each item's energy is below a threshold, after a certain amount of time or iterations.

27 Claims, 5 Drawing Sheets

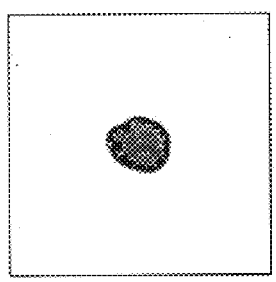 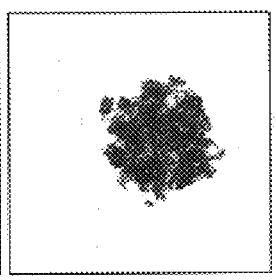 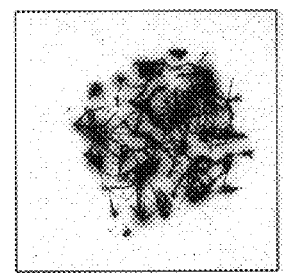 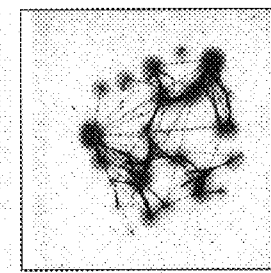
Fig. 2a    Fig. 2b    Fig. 2c    Fig. 2d
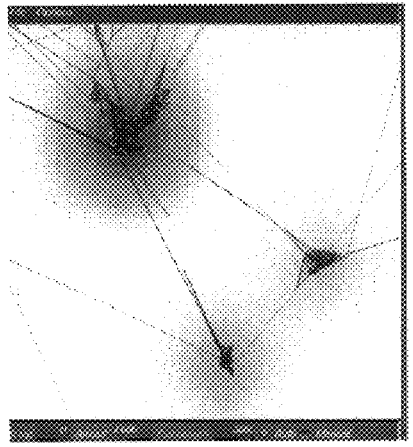
Fig. 2e

METHOD USING A DENSITY FIELD FOR LOCATING RELATED ITEMS FOR DATA MINING This invention was made with Government support under Contract DE-AC04-94AL85000 awarded by the U. S. Department of Energy. The Government has certain rights in the invention.

BACKGROUND OF THE INVENTION

This invention relates to the field of data mining, specifically the location of related items in a geometric space for the exposition of the relationships of database items in large databases.

Large databases are becoming commonplace. The INSPEC database on Dialog had almost 4 million records in one file as of November 1990, where records represent scientific articles, books, and papers. The Institute for Scientific Information maintains a database called SCISEARCH, where one file had almost 11 million records as of July 1991. The American Business Directory database had information on over 10 million companies in May 1995. The CLAIMS/U.S. Patents database provides access to over 2 million patents. Countless other private databases exist, storing information such as employee and student records, addresses, customer profiles, and household buying habits.

Even information not stored as a conventional database can have database-like qualities. For example, individual Web pages contain some information; the aggregation of many Web pages contains a large amount of information. Relationships between Web pages are not explicitly stored as in a database, but can be inferred from referencing among the pages. Other examples include financial transactions, not stored as a conventional database but nonetheless representing a large volume of information, with each item of information potentially related to many other items.

Searching and retrieval systems operating with large databases generally allow retrieval of individual items, or retrieval of sets of items related in some way. For example, some databases allow retrieval of individual items. Other databases allow searching for items containing certain keywords or topical markers. The large size of the database makes it more likely that a user can successfully find and retrieve the desired items.

The large size of the database, however, also makes it less likely that the user can comprehend the relationships among the many items in the database. The user can find individual items, and can find groups of related items. The user can not, however, access the structure of the relationships among the items.

The structure of the relationships among items can convey much useful information. For example, a lawyer can use Shepards to find a linear chain of related cases, but can not see beyond that chain to deduce how the cases relate to other such chains. Other lines of reasoning and rules of law in different areas can grow from a line of cases, or a line of cases can itself grow out of several preceding themes in the law. While the relationships among cases are usually explicit through case citations, the structure of the relationships can not be understood using existing search and retrieval tools.

As another example, scientific papers represent the state of research, and often have explicit relationships to other papers through references. Bibliographies and citation lists can help illuminate relationships in a specific area, but are not sufficient to illuminate the ways fields of research grow together, build on each other, or spawn new fields over time.

For databases containing only a few items, a user can read items, analyze relationships, and draw diagrams to deduce the relationships. Databases with more than a few items have much more information embedded in the relationships, but the relationships are too many and too complex for a user to analyze or comprehend from existing search and retrieval tools. Consequently, there is a need for a process that allows a user to comprehend the structure of relationships among items in databases having many items.

SUMMARY OF THE INVENTION

The present invention provides a method for locating related items in a geometric space. The method comprises locating the items in a geometric space so that the items' relative locations in the geometric space correspond to the relationships among the items. The translation of arbitrary relationships to geometric relationships can foster more efficient communication of the relationships among the items. The method is especially beneficial for communicating databases with many items, and with non-regular relationship patterns. Examples of such databases include databases containing items such as scientific papers or patents, related by citations or keywords, and databases dominated by relationships rather than by content, such as calling or billing records. A computer system adapted for practice of the present invention can include a processor, a storage subsystem, a display device, and computer software to direct the location and display of the entities.

The method makes use of numeric values as a measure of similarity between each pairing of items. The items are given initial coordinates in the space. An energy is then determined for each item from the item's distance and similarity to other items, and from the density of items assigned coordinates near the item. The distance and similarity component can act to draw items with high similiarities close together, while the density component can act to force all items apart. If a terminal condition is not yet reached, then new coordinates can be determined for one or more items, and the energy determination repeated. The iteration can terminate, for example, when the total energy reaches a threshold, when each item's energy is below a threshold, after a certain amount of time or iterations.

Advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

FIGS. 2($a,b,c,d,e$) are color drawings of coordinate assignment according to the present invention.

DETAILED DESCRIPTION OF THE INVENTION

The present invention provides a method for locating related items in a geometric space. The method comprises locating the items in a geometric space so that the items' relative locations in the geometric space correspond to the relationships among the items. The translation of arbitrary relationships to geometric relationships can foster more efficient communication of the relationships among the items. The method is especially beneficial for communicating databases with many items, and with non-regular relationship patterns. Examples of such databases include databases containing items such as scientific papers or patents, related by citations or keywords, and databases dominated by relationships rather than by content, such as calling or billing records. A computer system adapted for practice of the present invention can include a processor, a storage subsystem, a display device, and computer software to direct the location and display of the entities. Methods compatible with the present inventions are described in "Knowledge Mining with VxInsight: Discovery through Interaction", *Journal of Intelligent Information Systems*, 11, 259–286 (1998), incorporated herein by reference, and in U.S. patent application Ser. No. 08/918,519, incorporated herein by reference, and "Landscape, games, and maps for technology planning", *ChemTech*, June 1999, incorporated herein by reference.

Figure 1:
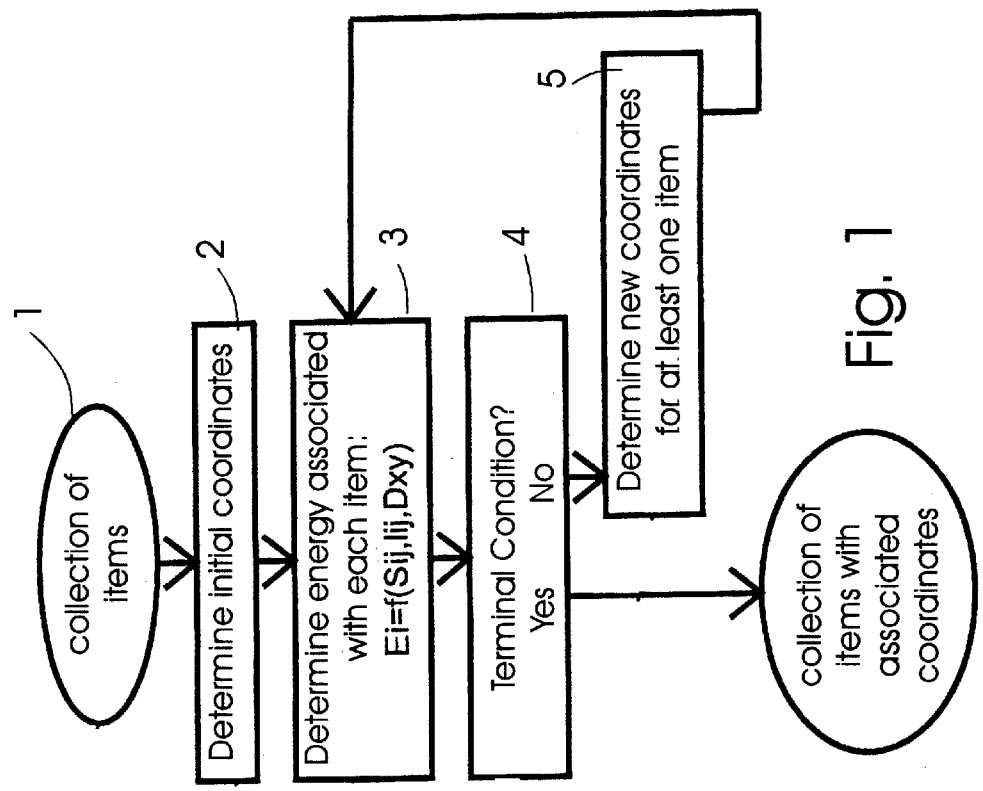
FIG. 1 is a flow diagram of coordinate assignment according to the present invention.

FIG. 1 is a simplified flow diagram of a process according to the present invention. The process begins with a database or collection of items 1. As used herein, a database can be any collection of related items. Initial coordinates in a geometric space are assigned to the items 2. Initial coordinates can be assigned in several ways: at random, all the same, in some defined pattern, or other ways that will be apparent to those skilled in the art. An energy is determined for each item 3 from the item's distance to and similarity to other items, and the density of items assigned coordinates near the item. If a terminal condition is reached 4, then the items with their associated coordinates can be output for use, for example for use in storing or displaying the items according to the coordinates. If a terminal condition is not reached 4, then new coordinates can be assigned to one or more items 5, and the process repeated with a new energy determination. Each step is discussed in more detail below, followed by example implementation and results.

Initial Coordinates

Initial coordinates can be assigned in several ways. For example, all items can be assigned the same coordinates initially. Highly similar items will accordingly be very close together, but the density of objects will be very high. The density component of the energy determination will force the objects to spread across the space.

As another example, items can be assigned initial coordinates at random. Both components of the energy determination will work to bring highly similar items closer together without increasing the density of items in any area too high.

Other ways to assign initial coordinates will be apparent to those skilled in the art.

Determining Energy Associated With Each Item

An energy associated with each item can be determined from the item's distance to and similarity to other items, and the density of items assigned coordinates near the item. The distance and similarity component can serve to attract items with high similarity to each other in the space, while the density component can serve to force all items apart (filling the space). Those skilled in the art will appreciate various combinations of the two components. An example energy determination is shown in Equation 1.

$$E_i = \left[\sum_{j=0}^{n} (S_{i,j} * l_{i,j}^2)\right] + D_{x,y} \qquad \text{Equation 1}$$

In Equation 1, $E_i$ is the energy associated with the placement of item i at coordinates x, y; $S_{i,j}$ is the similarity between item i and item j, $l_{i,j}$ is the distance in the space between coordinates x,y and the coordinates assigned to item j, and $D_{x,y}$ is the density of items assigned coordinates near x,y. The energy associated with an item can be reduced by reducing the distance to similar items. Reducing the distance to similar items, however, can increase the density component. Accordingly, reducing the energy associated with an item involves the minimization of distance to other items with high similarities and maximization of distance to items with no similarities.

The exponent on the distance determines the 'flexibility' of the graph links. A lower exponent (e.g., 1 or 2) allows the links to stretch more freely and can lead to a better global solution. Conversely, a high exponent severely increases the energy function with any increase in distance between connected objects. This can lead to a better local solution but not necessary in a better global solution. The density function can be the summation of objects within a radius. This radius increases the energy of any objects coming within the radius. This can have the effect of 'pushing' objects without connections a least a radius away. The density function can also have an exponent applied to the summation. This exponent can be much like the exponent on the link distance: a high exponent increases the energy cost of placing objects near each other. This can lead to inflexibility of movement of particles through the space.

The function $D_{x,y}$ can be computed in many different ways. A simple approach is to base $D_{x,y}$ on the distance to all other nodes. Each node can check its position against all other nodes, requiring order(N) comparisons (where N=number of objects) for each determination of $D_{x,y}$. Each node must compute $D_{x,y}$ when determining its energy at a specific location x,y, so in total the simple approach can require order($N^2$) running time.

For large datasets an order($N^2$) running time can be prohibitively computationally expensive. Another method of computing $D_{x,y}$ can allow each node to determine an approximate value for $D_{x,y}$ in constant time (order(1)), thereby reducing the total running time to order(N). The method begins by having each node place an energy footprint onto a k-dimensional array (density field), where k is the dimensionality of the desired geometric space (two in the examples below). The energy footprint can be any function meaningful in the geometric space. For example, each object can place an energy footprint that is highest at its assigned coordinates, and decreases with increased radial distance therefrom. Other examples include k-dimensional Gaussian functions, k-dimensional sinusoidals, and other k-dimensional functions familiar to those skilled in the art. The density field can be constructed by summing each node's energy footprint. Having each node contribute an energy footprint to the density field requires order(N) time.

Once the density field is constructed, an object can determine an approximate value to the $D_{x,y}$ term by a constant time lookup into the density field at the location corresponding to the object's assigned coordinates. Having each node look up the value of the density field at their current location requires order(N) time. The combination of order(N) density field construction and order(N) lookup yields an order(N) total time, reducing the computational cost associated with determining the density component of the energy determination.

Terminal Condition

The energy represents a measure of the quality of coordinate assignment: higher energies correspond to coordinate assignments where similar items are more separated and dissimilar items are less separated. Adjusting coordinates so that energy is reduced can lead to item placement that more accurately and completely expresses in the space the relationships among the items. Minimization of energy to guide a problem space search can be addressed with various techniques known to those skilled in the art. For example, simulated annealing can be useful with the present invention.

Problem space searches, especially with very large numbers of items, can be time-intensive. Accordingly, the search can be terminated before exhaustive search of a single minimal coordinate set. For example, the search can be terminated after a certain amount of computer time, or after a certain number of coordinate determinations and corresponding energy determinations. The search can also be terminated based on the energy determination, for example when the total energy is below a threshold or when some portion of the items all have energies below a threshold.

New Coordinates

New coordinates can be assigned to items in various ways. As previously described, techniques known to those skilled in the art can be compatible with the present invention. For example, simulated annealing can guide the size of the jumps from former coordinates to new coordinates for each item. At each step, new coordinates can be proposed for one, some, or all the items, depending on the search strategy employed. Heuristics such as those described below can reduce the time to determine acceptable coordinates, at the possible expense of finding global optimization (a common tradeoff in searches of very large search spaces).

The energy of an item can be determined at its proposed new coordinates before accepting a new set of coordinates for the item. New coordinates that increase an item's energy can thereby be discarded, potentially decreasing the time required to arrive at an acceptable set of coordinates.

A concept analogous to mechanical momentum has been found to speed the search in some applications of the present invention. The direction taken at the last coordinate change (the last change that resulted in lower item energy) can be stored. New coordinates can then be proposed that continue at least some aspects of the previous direction. For example, new coordinates can be proposed that are on a direction coincident with the previous direction, or on a direction forming an acute angle relative to the previous direction. Backtracking to previously explored regions of the search space can thereby be reduced.

Determining Similarities

For use with the present invention, similarities between items can be based on many diverse characteristics of the items. For example, scientific papers can be similar if they contain common keywords. Alternatively, scientific papers can be similar if one paper cites the other paper, or if they both cite certain other papers. As another example, patents can be similar if they both cite the same other patent. Alternatively, they can be similar if they contain the same keywords, or if they share the same classification. Other characteristics can be used for assessing similarity, including geographic origin, time of origin, institutional origin, and authorship.

In general any attribute that can be shared among items can be the basis for similarity. The structure of the relationships portrayed will reflect the structure of the relationships defined by the chosen similarity metric. Different item characteristics and different application objectives can determine what criteria is useful for determining similarity. Several examples are given below to help illustrate some of the many possibilities. For example, two companies can be similar if they sell or buy from each other. They can also be similar if they are from the same region, in the same industry, have the same credit rating, have similar stock performance, or transact with the same financial institutions. Proteins can be judged to be similar if they contain aligning amino acid sequences, or can be similar if they can be produced by the same process. Web pages can be similar if they reference each other, or can be similar if they share domains.

User Input

Input from a user can tailor the information displayed to meet the user's specific requirements. For example, user input can direct the selection of an aspect for display, such as a subset of the geometric space. Additionally, user input can direct the display of only items having certain attributes, such as institutional origin or time of origin. Additionally, user input can direct the display of detailed information about items, such as more complete identification of individual items or more detailed display of specific links among items. User input can be accepted from a keyboard, a mouse or other pointing device, voice commands, or any other interface suitable for user interaction. Those skilled in the art will appreciate specific interface software to communicate with specific input devices. Feedback mechanisms such as sound or haptic feedback can make user interaction more intuitive.

User input can select a portion of the space for display, for example by specifying certain regions to display in more detail. User input can also direct the information about the items displayed. Those skilled in the art will appreciate software that can interpret user input and direct display software to perform the functions directed by the user.

Directing the Display of the Geometric Space

A data mining system according to the present invention can allow the user to select only certain portions of the database. For example, the user can direct the display of only items with dates in a certain range or with particular origins. The user can direct the display of items with certain dates, then direct the selected data range to vary with time, allowing the user to see the evolution of the database relationships over time. The user can also direct the display of only items with certain attributes. For example, the user can direct the display only of items within a certain distance of a selected item, allowing the user to "zoom in" for more detail in areas of particular interest.

A user can also direct that selected items be displayed with selected attributes (such as color or highlighting). The user can thereby emphasize and de-emphasize certain items, for example those from one institution can be emphasized to illustrate the work of that institution in a given technology. As another example, items with dates before a certain date can be de-emphasized, focusing the user's attention on the most recent items.

The user can also direct that selected information be displayed or suppressed. For example, when viewing a large number of items, the user can direct that only aggregate representations be displayed. When smaller numbers of items are to be viewed, the user can direct that more detail be displayed for each item. For example, names describing groups of items can be displayed when large numbers of items are visible; names of individual items can be displayed when fewer items are visible. Similarities between items can also be displayed, with color or shape corresponding to direction and magnitude of the similarity. Because the display is based on individual items, the user can access any information in the database concerning each item.

Full database connectivity allows for real time user querying to extract additional information. For example, the user can direct the display to highlight papers from a specific institution or country, allowing the user to understand the relationship between sources and research areas. This additional insight can provide guidance for direction of future activity, as well as help identify sources of complementary research, anticipating potential collaborative programs. It can also help identify most likely competitors.

Displaying a Portion of the Geometric Space

The selected characteristics of the geometric space can be displayed via any approach that allows a user to comprehend a representation of a multi-dimensional space. For example, the geometric space can be communicated to the user by displaying a window looking onto a multidimensional landscape. Zooming, panning, tilting, and other display manipulations common to this type of display can be made available to the user. Requests for changes to the display can be routed directly to the database server, and the resulting changes highlighted in the display. The user can thereby focus attention on selected aspects of the structure of the database, and explore the aspect by interaction with the database.

As an alternative to displaying a window looking onto the geometric space, the geometric space can be communicated to the user via an immersive environment. The user would then be "in" the geometric space, and able to interact with items and relationships among items. The user can then control the display and interact with the database by voice commands or by selected body movements (e.g., by. pointing at an item, turning to look at a part of the space, or pulling controls through the space).

Example Coordinate Determination

FIGS. 2(a,b,c,d,e) show representations of coordinate determination according to the present invention. FIGS. 2(a,b,c,d) show coordinates at several intermediate stages of the search. FIG. 2e shows the density field and its effect on coordinate determination. The values in the legend at the bottom of each display represent parameters determining the size of each 'jump' to a next coordinate location, and a coefficient used in an attraction term to guide expansion and compression of the space.

In FIG. 2a most of the items are assigned coordinates near each other, corresponding to one example initial assignment (a small random value). Highly related items are close together, but so are unrelated items. The density of items is very high, so the energy of the coordinate assignment is high.

FIG. 2b shows the same set of items after several iterations of determining new coordinates. The density of items is pushing all the items apart, while the relationship component of the energy determination is keeping highly related items clustered. The energy of the assignment in FIG. 2b is less than that in FIG. 2a.

FIG. 2c shows the same set of items after several more iterations of determining new coordinates. The single mass of FIG. 2a is gone; recognizable clusters of highly related items are now apparent. The density component of the energy is forcing the cluster of highly related items away from other clusters, while the attraction term keeps related items clustered.

FIG. 2d shows the same set of items after several more iterations of determining new coordinates. The clusters of highly related items are more clearly defined. The structure among clusters has become apparent. A few long arcs, indicating related items with coordinates placing them far apart, are visible. Most of the related items, however, are placed close to their relatives. An increased attraction coefficient can make the clusters more tightly packed. Structure in the relationships that would not be apparent from the original complex database is now apparent visually.

FIG. 2e shows a closeup of a portion of the space shown in FIG. 2(a,b,c,d). The density field is represented by the intensity of the light background. The density is high near the large cluster, but a high degree of relationships keep the items clustered. Less-related items, for example those in the other two clusters, have been pushed away from the large cluster. The separation provides visual indication of the structure of the database relationships.

EXAMPLE 1

FIGS. 3(a,b,c,d) show aspects of communicating relationships expressed by coordinate determination according to the present invention. The representations are of a database with approximately 8200 documents, obtained by querying for papers relating to nuclear technology from the Physical Sciences database maintained by ISI. The resulting collection of papers can be assigned similarity values. Each paper can then be assigned coordinates in a two dimensional space according to the method described above.

Figure 3A:
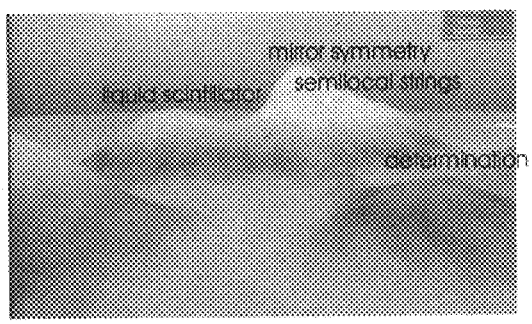
FIGS. 3($a,b,c,d$) are color drawings containing representations of a geometric space corresponding to a database, generated according to the present invention.

FIG. 3a shows a representation of the resulting two dimensional space. In FIG. 3a, the apparent height of the surface above a base plane corresponds to the density of papers assigned coordinates on the portion of the base plane under the surface defined by the two dimensional space. The color of the surface corresponds to the apparent height. The display shows papers concerning "mirror symmetry" and papers concerning "semilocal strings" placed near each other in the geometric space, indicating that the papers were substantially similar. Accordingly, they were assigned coordinates near each other in the two dimensional space. There were also relatively many such papers, represented by the apparent height and color of the surface. Papers treating "liquid scintillator" were somewhat similar to the first two groups, and less similar to papers treating "determination." The descriptive labels and landscape display can make the overall structure of the relationships among the items readily apparent to the user. Note that the descriptive words are for reference convenience, and can be dictated by the user or generated based on the items in the display.

Figure 3B:
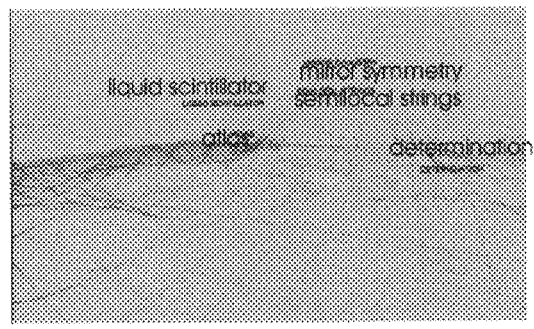

FIG. 3b shows the same portion of the two dimensional space as FIG. 3a, but in a wireframe display. The apparent height of the wireframe surface still corresponds to the local density of papers. Additionally, the location of individual papers in the two dimensional space is represented by individual red markers. The structure of the relationships among individual items can be readily understood by combining the surface height with the relative locations of the individual paper markers.

Figure 3C:
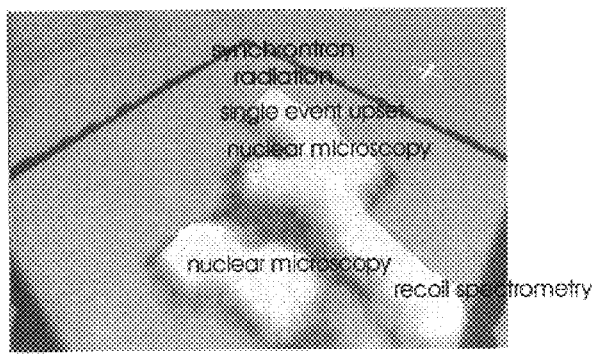

FIG. 3c shows another view of the two dimensional space. The view in FIG. 3c represents a "zoomed" view of the representation in FIG. 3a. More detail about the structure of the relationships is now apparent. For example, research treating "recoil spectrometry" can be seen branching off from one group of papers treating "nuclear spectroscopy." Another group of papers, also treating "nuclear microscopy," is less related to "recoil spectroscopy" but more closely related to "pixel analysis." Representing the items according to the present invention can make it possible for the user to comprehend the complex structure among many scientific papers by viewing and manipulating the display.

Figure 3D:
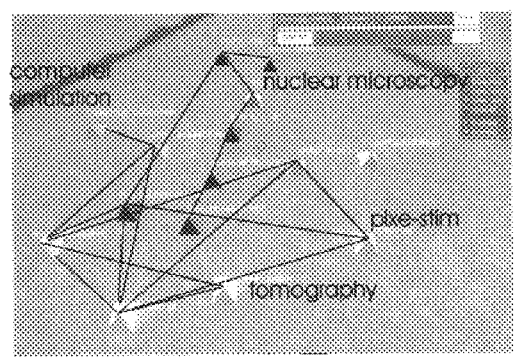

FIG. 3d shows another view of the two dimensional space. The view in FIG. 3d represents a "zoomed" view of the representation in FIG. 3c. The view now shows individual papers, represented as colored triangles. References between papers are shown as colored lines between the corresponding triangles. The coloring of the lines can represent the direction of citation (i.e., which paper cited which other paper). The coloring of the triangles can represent the number of citations to the paper, thereby highlighting those papers cited by many others. Even with a small number of items, the present invention allows more intuitive and more complete user comprehension of the structure of the relationships among the items.

EXAMPLE 2

FIGS. 4(a,b,c,d,e) show aspects of communicating relationships expressed by coordinate determination according to the present invention. The representations are of an Analytical Chemistry subset of the Physical Sciences database maintained by ISI. The representations are of a portion of the database, selected to include only those papers published within a moving two year period. Changes in the representation as the two year period moves forward in time illustrate changes in the state of technology over time.

Figure 4A:
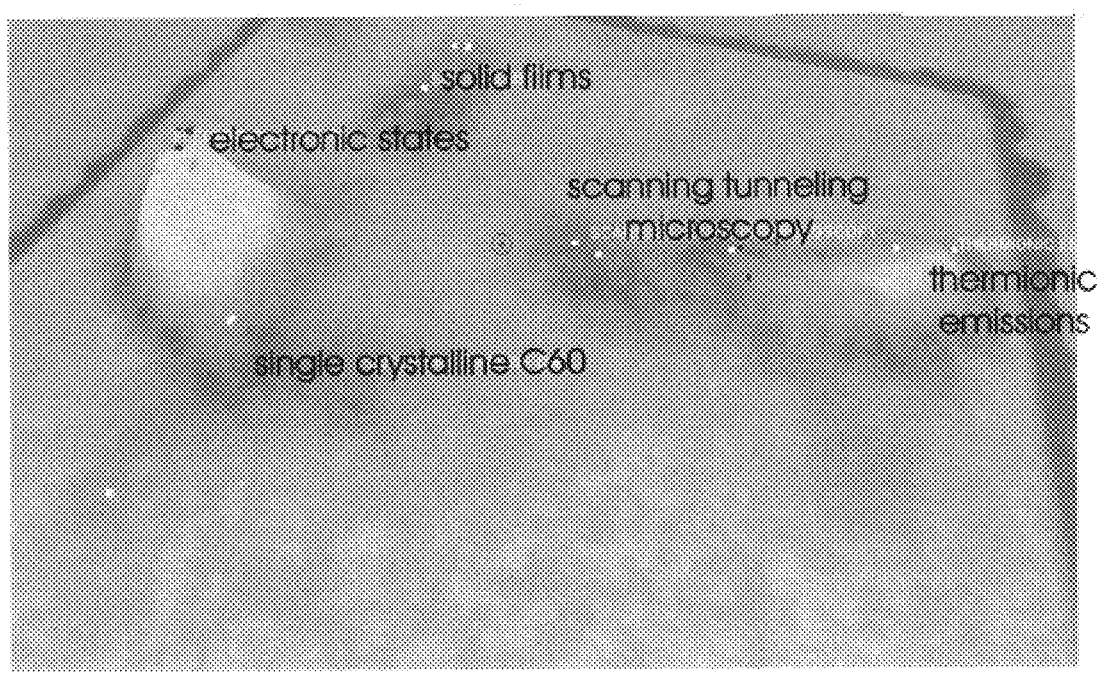
FIGS. 4($a,b,c,d,e$) are color drawings containing representations of the evolution of database item relationships over time, generated according to the present invention.
Figure 4B:
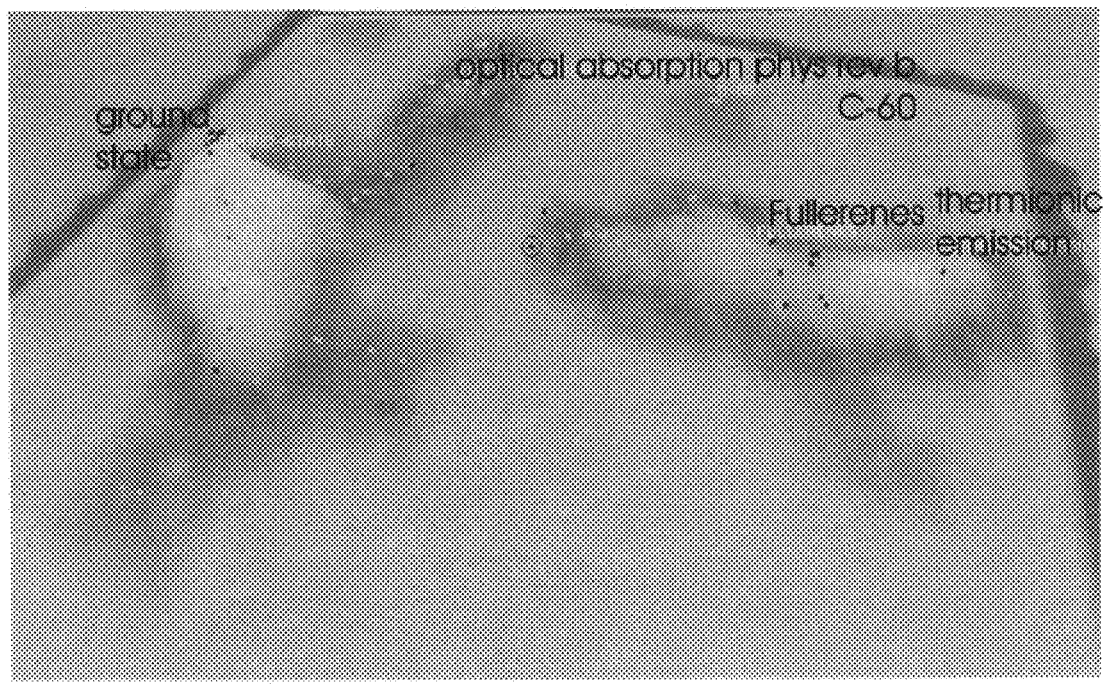
Figure 4C:
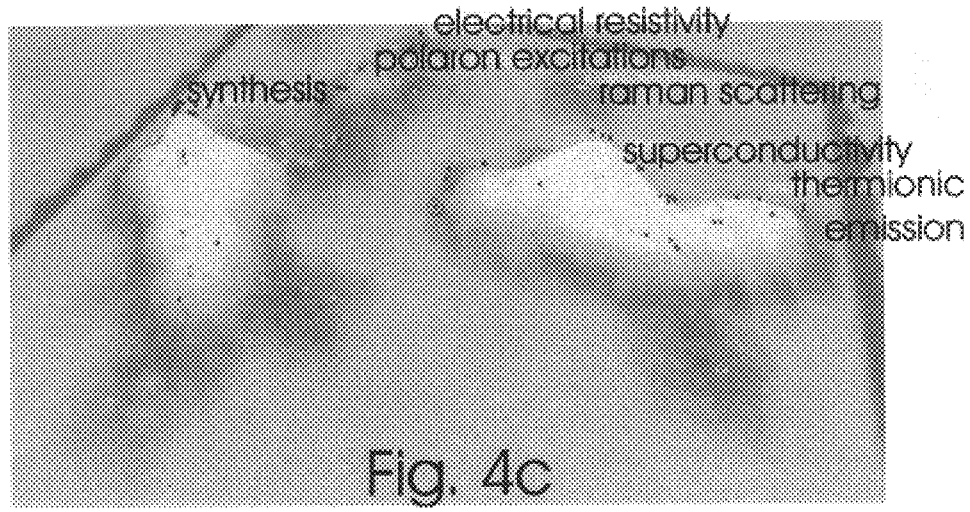
Figure 4D:
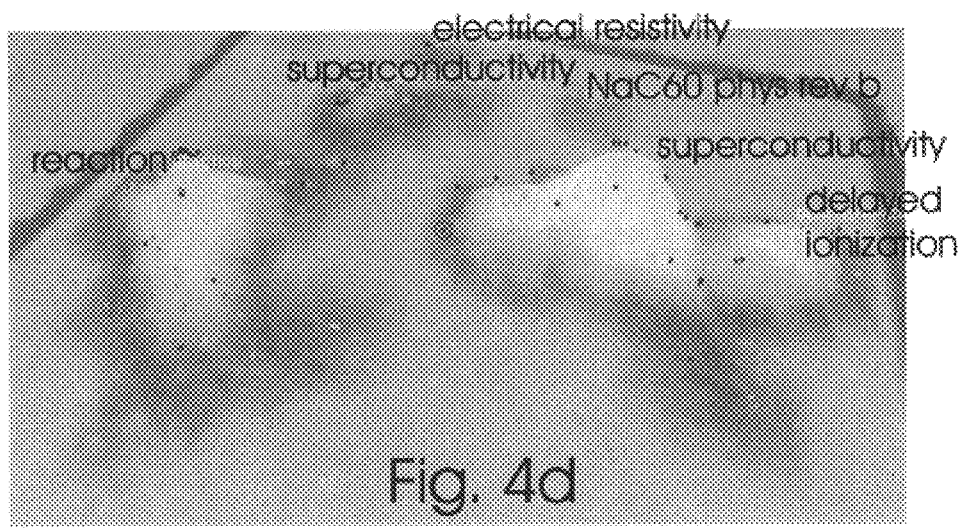
Figure 4E:
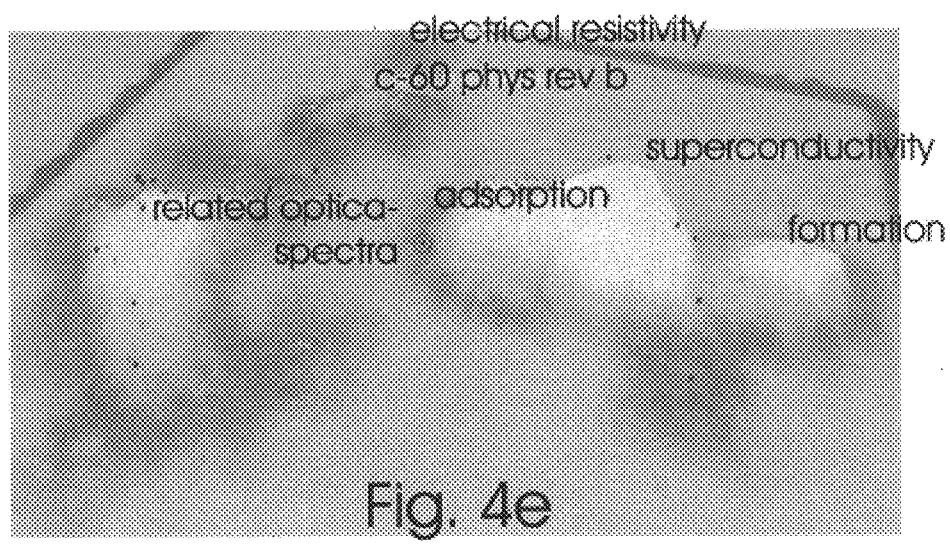

FIG. 4a corresponds to a two year period centered at 1990. FIG. 4b corresponds to a two year period centered at 1991. FIG. 4c corresponds to a two year period centered at 1992. FIG. 4d corresponds to a two year period centered at 1993. FIG. 4e corresponds to a two year period centered at 1994. The peak shown at the lower left in FIG. 4a represents a large group of related papers; corresponding to an active area of publication in the corresponding period. The peak grows in FIG. 4b, then begins to increase in breadth and decrease in height as seen in FIGS. 4(c,d,e), representing growth in the technology and eventual branching out into other areas.

A second, smaller ridge in the right portion of FIG. 4a grows in both height and breadth over time. The papers corresponding to the second ridge can thus be seen to have been foundations for the later papers, spawning large number of papers in at least three related groups (the three sub-peaks in FIG. 4e).

Another area of research can be seen first appearing in FIG. 4b, near the top of the display (labeled "C-60"). No clear precursors appear in FIG. 4a, representing an initial foray into a previously unexplored technology area. A relatively few other papers can be seen in the same area in FIGS. 4c and 4d. The color and height of the surface are back to neutral levels in FIG. 4e, representing an area no longer active in publication.

Example System

Figure 5:
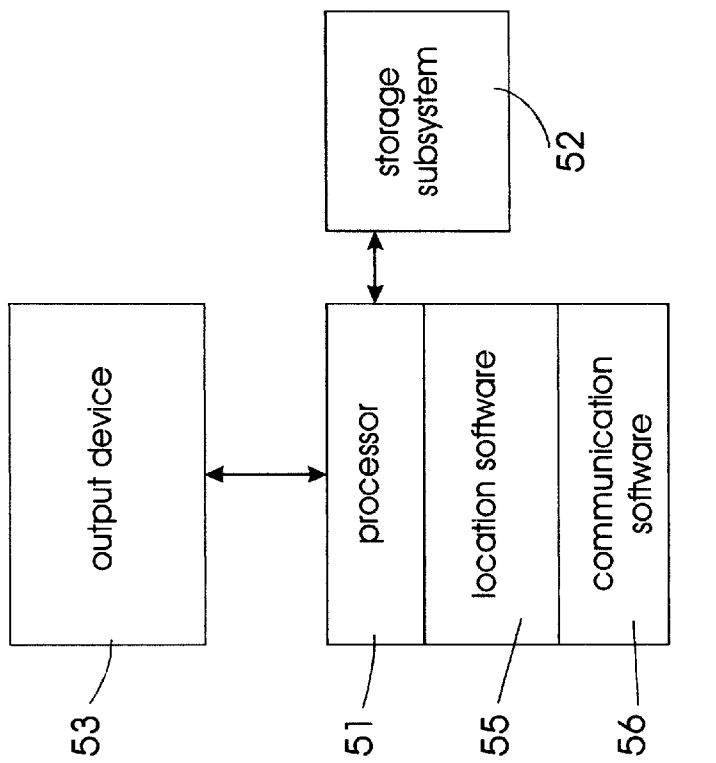
FIG. 5 is an illustration of a computer system suitable for practice of the present invention.

FIG. 5 shows a computer system suitable for use with the present invention. Processor 51 operatively connects with storage subsystem 52 and output device 53. Processor 51 can be, for example, a microprocessor such as those found in personal computers, a system such as those found in workstations, or a plurality of processors operating in parallel. Storage subsystem 52 can be, for example, an optical or electromagnetic disk storage system, a random access memory system, a electromagnetic tape storage system, or networked access to information stored remotely. Output device 53 can be, for example, a conventional computer display screen or a multi-dimensional virtual reality environment. A plurality of items and the relationships therebetween can be stored in storage subsystem 52. Those skilled in the art will appreciate computer software 54 that can direct processor 51 to perform the steps disclosed above for locating the items in a geometric space. After the items are located, additional computer software 55 known to those skilled in the art can direct the communication of the items in the geometric space using output device 53.

The present invention was implemented on a contemporary desktop computer using Windows 95/NT and an Intel processor. The software has connections to many types of databases using the ODBC (Open DataBase Connection) protocol, these include Oracle, Access, and Sybase. The user interface was developed using the OpenGL and C++ programming languages. The desktop computer comprised 128 MB of RAM, a 4 GB internal disk, and a PII-400 MHz processor.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

I claim:

1. A method for determining coordinates in a d-dimensional space, where d is at least two, for a plurality of related items V(i) in a computer-readable database, indexed from 1 to n, where the relationship between items is represented by a similarity $S_{i,j}$ for the relationship between item V(i) and item V(j), comprising:

a) Determining initial coordinates for each item;
   b) Determining an energy associated with each item from said item's distance and similarity to other items and from the density of items assigned coordinates near said item's coordinates;
   c) If a terminal condition is not reached, then:
      i) Assigning new coordinates to at least one item;
      ii) Repeating from step b).

2. The method of claim 1, wherein the step of determining an energy comprises determining, for each item V(i), $$\left[\sum_{j=0}^{n} (S_{i,j} * l_{i,j}^{k1})\right] + D_{x,y}^{k2},$$

where $l_{i,j}$ is the distance in the d-dimensional space between V(i) and item V(j), k1 is an exponentiation applied to $l_{i,j}$, $D_{x,y}$ represents the density of items assigned coordinates near the coordinates assigned to item V(i), and k2 is an exponentiation applied to $D_{x,y}$.

3. The method of claim 1, wherein the step of determining initial coordinates is selected from the group consisting of: assigning items the same coordinates, assigning random coordinates, accepting input assigning initial coordinates, and combinations thereof.

4. The method of claim 1, wherein the step of assigning new coordinates to at least one item comprises:

a) generating proposed new coordinates;
   b) determining a proposed energy associated with said item from said item's distance and similarity to other items and from the density of items assigned coordinates near said item's coordinates;
   c) if said proposed energy is not greater than the energy determined using the item's previous coordinates, then using the proposed coordinates as new coordinates.

5. The method of claim 4, wherein the step of generating proposed new coordinates comprises:

a) Defining a last move direction as the direction from the then-current coordinates to the then-new coordinates;

b) Generating proposed new coordinates such that the direction from the current coordinates to the proposed new coordinates forms an acute angle relative to the last move direction.

6. The method of claim 1, wherein the termination condition is selected from the group consisting of: a maximum amount of time, a maximum number of iterations of steps b) and c), each item having an energy below a threshold, the total of all the items' energy below a threshold, the decrease in each item's energy below a threshold, the decrease in the total of all the items' energy below a threshold, and combinations thereof.

7. A method for displaying a plurality of related items in a computer-readable database, in a d-dimensional space, where d is at least two, where the relationship between items is represented by a similarity $S_{i,j}$ for the relationship between item V(i) and item V(j), comprising:

a) Determining initial coordinates for each item;

b) Determining an energy associated with each item from said item's distance and similarity to other items and from the density of items assigned coordinates near said item's coordinates;

c) If a terminal condition is not reached, then:
i) Assigning new coordinates to at least one item;
ii) Repeating from step b);

d) If a terminal condition is reached, then displaying at least part of the d-dimensional space with indications of at least some of the items assigned coordinates therein.

8. The method of claim 7, wherein the step of determining an energy comprises determining, for each item V(i), $$\left[\sum_{j=0}^{n} (S_{i,j} * l_{i,j}^{k1})\right] + D_{x,y}^{k2},$$

where is the distance in the d-dimensional space between V(i) and item V(j), k1 is an exponentiation applied to $l_{i,j}$, $D_{x,y}$ represents the density of items assigned coordinates near the coordinates assigned to item V(i), and k2 is an exponentiation applied to $D_{x,y}$.

9. The method of claim 7, wherein the step of determining initial coordinates is selected from the group consisting of: assigning items the same coordinates, assigning random coordinates, accepting input assigning initial coordinates, and combinations thereof.

10. The method of claim 7, wherein the step of assigning new coordinates to at least one item comprises:

a) generating proposed new coordinates;

b) determining a proposed energy associated with said item from said item's distance and similarity to other items and from the density of items assigned coordinates near said item's coordinates;

c) if said proposed energy is not greater than the energy determined using the item's previous coordinates, then using the proposed coordinates as new coordinates.

11. The method of claim 10, wherein the step of generating proposed new coordinates comprises:

a) Defining a last move direction as the direction from the then-current coordinates to the then-new coordinates;

b) Generating proposed new coordinates such that the direction from the current coordinates to the proposed new coordinates forms an acute angle relative to the last move direction.

12. The method of claim 7, wherein the termination condition is selected from the group consisting of: a maximum amount of time, a maximum number of iterations of steps b) and c), each item having an energy below a threshold, the total of all the items' energy below a threshold, the decrease in each item's energy below a threshold, the decrease in the total of all the items' energy below a threshold, and combinations thereof.

13. A computer system adapted to determine coordinates in a d-dimensional space, where d is at least two, for a plurality of related items V(i) in a computer-readable database, indexed from 1 to n, where the relationship between items is represented by a similarity $S_{i,j}$ for the relationship between item V(i) and item V(j), comprising a) A processor;

b) A storage subsystem accessible from said processor and adapted to store information identifying the items and the similarities;

c) Software accessible to said processor and adapted to:
i) Determine initial coordinates for each item;
ii) Determine an energy associated with each item from said item's distance and similarity to other items and from the density of items assigned coordinates near said item's coordinates;
iii) If a terminal condition is not reached, then:
a) Assign new coordinates to at least one item;
b) Repeat from step ii).

14. The computer system of claim 13, wherein the software adapted to determine an energy comprises software adapted to determine, for each item V(i), $$\left[\sum_{j=0}^{n} (S_{i,j} * l_{i,j}^{k1})\right] + D_{x,y}^{k2},$$

where $l_{i,j}$ is the distance in the d-dimensional space between V(i) and item V(j), k1 is an exponentiation applied to $l_{i,j}$, $D_{x,y}$ represents the density of items assigned coordinates near the coordinates assigned to item V(i), and k2 is an exponentiation applied to $D_{x,y}$.

15. The computer system of claim 13, wherein the software adapted to determine initial coordinates is selected from the group consisting of: software adapted to assign items the same coordinates, software adapted to assign random coordinates, software adapted to accept input assigning initial coordinates, and combinations thereof.

16. The computer system of claim 13, wherein software adapted to assign new coordinates to at least one item comprises software adapted to:

a) generate proposed new coordinates;

b) determine a proposed energy associated with said item from said item's distance and similarity to other items and from the density of items assigned coordinates near said item's coordinates;

c) if said proposed energy is not greater than the energy determined using the item's previous coordinates, then use the proposed coordinates as new coordinates.

17. The computer system of claim 16, wherein software adapted to generate proposed new coordinates comprises software adapted to:

a) Define a last move direction as the direction from the then-current coordinates to the then-new coordinates;

b) Generate proposed new coordinates such that the direction from the current coordinates to the proposed new coordinates forms an acute angle relative to the last move direction.

18. The computer system of claim 13, wherein the termination condition is selected from the group consisting of: a maximum amount of time, a maximum number of iterations of steps ii) and iii), each item having an energy below a threshold, the total of all the items' energy below a threshold, the decrease in each item's energy below a threshold, the decrease in the total of all the items' energy below a threshold, and combinations thereof.

19. The method of claim 2, wherein $1 \leq k1 \leq 3$ and $0 < k2 \leq 2$.

20. The method of claim 2, wherein k1 is substantially 2 and k2 is substantially 1.

21. The method of claim 8, wherein $1 \leq k1 \leq 3$ and $0 < k2 \leq 2$.

22. The method of claim 8, wherein k1 is substantially 2 and k2 is substantially 1.

23. The apparatus of claim 14, wherein $1 \leq k1 \leq 3$ and $0 < k2 \leq 2$.

24. The apparatus of claim 14, wherein k1 is substantially 2 and k2 is substantially 1.

25. The method of claim 1, wherein the density of items assigned coordinates near said item's coordinates is determined by:
   a) Forming a d-dimensional density space from energy footprints corresponding to the coordinates of the items; and
   b) Accessing the d-dimensional density space location corresponding to said item's coordinates.

26. The method of claim 7, wherein the density of items assigned coordinates near said item's coordinates is determined by:
   a) Forming a d-dimensional density space from energy footprints corresponding to the coordinates of the items; and
   b) Accessing the d-dimensional density space location corresponding to said item's coordinates.

27. The computer system of claim 13, wherein the software adapted to determine the density of items assigned coordinates near said item's coordinates comprises software adapted to:
   a) Form a d-dimensional density space from energy footprints corresponding to the coordinates of the items; and
   b) Access the d-dimensional density space location corresponding to said item's coordinates.

* * * * *